(12) United States Patent
Wobben

(10) Patent No.: US 7,525,208 B2
(45) Date of Patent: Apr. 28, 2009

(54) METHOD FOR OPERATING A WIND TURBINE DURING A DISTURBANCE IN THE GRID

(76) Inventor: Aloys Wobben, Argestrasse 19, Aurich (DE) 26607

( * ) Notice: Subject to any disclaimer, the term of this patent is extended or adjusted under 35 U.S.C. 154(b) by 294 days.

(21) Appl. No.: 10/573,171

(22) PCT Filed: Sep. 22, 2004

(86) PCT No.: PCT/EP2004/010616

§ 371 (c)(1),
(2), (4) Date: Jan. 3, 2007

(87) PCT Pub. No.: WO2005/031941

PCT Pub. Date: Apr. 7, 2005

(65) Prior Publication Data

US 2007/0159737 A1    Jul. 12, 2007

(30) Foreign Application Priority Data

Sep. 23, 2003    (EP)    ................................. 03021439

(51) Int. Cl.
*F03D 7/00* (2006.01)
(52) U.S. Cl. ............................. 290/44; 290/43; 290/54; 290/55
(58) Field of Classification Search ............ 290/43, 290/44, 54, 55
See application file for complete search history.

(56) References Cited

U.S. PATENT DOCUMENTS

| | | | |
|---|---|---|---|
| 7,081,689 B2 * | 7/2006 | Tilscher et al. ................. | 290/44 |
| 7,126,236 B2 * | 10/2006 | Harbourt et al. ............... | 290/44 |
| 7,227,276 B2 * | 6/2007 | Caiozza ........................ | 290/55 |
| 2003/0007369 A1 | 1/2003 | Gilbreth et al. ................ | 363/35 |
| 2007/0085343 A1 | 4/2007 | Fortmann | |

FOREIGN PATENT DOCUMENTS

JP    5-300658    11/1993

(Continued)

OTHER PUBLICATIONS

Thiringer T., et al., "Grid Disturbance Response of Wind Turbines Equipped with Induction Generator and Doubly-Fed Induction Generator," *Proceedings of 2003 IEEE Power Engineering Society General Meeting*, Toronto, Ontario, Canada, Jul. 13-17, 2003, pp. 1542-1547.

Akhmatov, "Variable-speed Wind Turbines with Doubly-fed Induction Generators, Part II: Power System Stability," Wind Engineering, vol. 26, No. 3, 2002, pp. 171-188.

(Continued)

*Primary Examiner*—Nicholas Ponomarenko
*Assistant Examiner*—Iraj A Mohandesi
(74) *Attorney, Agent, or Firm*—Seed IP Law Group PLLC

(57) ABSTRACT

There is provided a method of operating a wind power installation. Under first operating conditions in a normal operating mode the wind power installation delivers a first power to a connected electrical network. That first power is proportional to the wind speed. The wind power installation is controlled in such a way that upon the occurrence of a disturbance it remains on the connected electrical network and delivers to the connected electrical network a second power which is lower than the first power. Upon cessation of the disturbance and under the first operating conditions a third power is briefly delivered to the connected electrical network, the third power being significantly higher than the first power.

11 Claims, 17 Drawing Sheets

FOREIGN PATENT DOCUMENTS

| | | |
|---|---|---|
| JP | 9-312934 | 12/1997 |
| JP | 11-159437 | 6/1999 |
| JP | 2002-101559 A | 4/2002 |
| JP | 2003-88190 A | 3/2003 |
| WO | 03065567 A1 | 8/2003 |
| WO | 2005027301 A1 | 3/2005 |

OTHER PUBLICATIONS

Dokopoulos et al., "Improvement of Power Quality Distortion in a Grid Caused by Wind Turbines," IEEE, 1998, pp. 917-922.

Koch et al., "Dynamic Interaction of large Offshore Wind Farms with the Electric Power System," IEEE Bologna PowerTech Conference, Jun. 23-26, 2003, pp. 1-7.

* cited by examiner

METHOD FOR OPERATING A WIND TURBINE DURING A DISTURBANCE IN THE GRID

BACKGROUND OF THE INVENTION

1. Field of the Invention

The present invention concerns a method for operating a wind turbine during a disturbance in the grid network and a corresponding wind turbine.

2. Description of the Related Art

As the electrical network to which wind turbines or wind power installations are connected does not always behave in a constant manner but can also have faults, some methods of controlling wind power installations have been developed, which have network-supporting properties.

BRIEF SUMMARY OF THE INVENTION

The object of the present invention is to improve network-supporting methods of operating wind power installations.

Accordingly, one exemplary embodiment provides a method of operating a wind power installation. Under first operating conditions in a normal operating mode the wind power installation delivers a first power to the connected electrical network. That first power is proportional to the wind speed. The wind power installation is controlled in such a way that it remains on the connected electrical network during a disturbance and delivers to the connected electrical network a second power which is lower than the first power. When the disturbance ceases and under the first operating conditions a third power is briefly delivered to the connected electrical network, the third power being significantly higher than the first power.

In that way a wind power installation can be controlled in such a fashion that, after the cessation or elimination of a disturbance the wind power installation intervenes in network-supporting relationship and for a short time feeds an increased level of power into the connected electrical network.

In accordance with an exemplary embodiment, the wind power installation has an intermediate storage means and the increased value of the third power is obtained by a control of the intermediate storage means. Accordingly for a short time after cessation of the disturbance the wind power installation provides a higher level of power which is higher than that power which is obtained in the normal operating mode under the given operating conditions.

Another embodiment concerns a wind power installation for delivering power to a connected electrical network. The wind power installation has a control unit for controlling the wind power installation. Under first operating conditions in a normal operating mode a first power is delivered to the electrical network, which is proportional to the wind speed. When a disturbance occurs a second power is delivered, which is less than the first power. After the cessation or upon the cessation of the disturbance, under the first operating conditions, a third power is delivered which is significantly higher than the first power.

Accordingly both the second and also the third power is disproportional to the wind speed while the first power is proportional to the wind speed.

Further configurations of the invention are subject-matter of the appendant claims.

Various embodiments are based on the notion that the delivered power of a wind power installation, after the elimination of a fault in the network, is briefly increased in order in that way to intervene in network-supporting relationship. That briefly increased delivery of power is implemented for example by suitable control of the dc voltage intermediate circuit or chopper. In the normal operating mode, under the corresponding operating conditions, a wind power installation delivers a first power to a network. When a disturbance occurs in the network the delivered power is reduced and, when the disturbance is eliminated, an increased power is delivered for a short period of time. In that situation that briefly increased level of power is markedly higher than the power delivered under the given operating conditions, that is to say, after the elimination of a fault significantly more power is delivered for a short time than in the normal operating mode under the operating conditions.

BRIEF DESCRIPTION OF THE SEVERAL VIEWS OF THE DRAWINGS

The invention is described in greater detail hereinafter by means of the embodiments by way of example and the accompanying drawing in which.

DETAILED DESCRIPTION OF THE INVENTION

The term "integration of embedded generation" refers hereinafter to the capacitance of energy units which are integrated in a part of an energy system, which exceeds the energy supplied by another part of the system.

Figure 1:
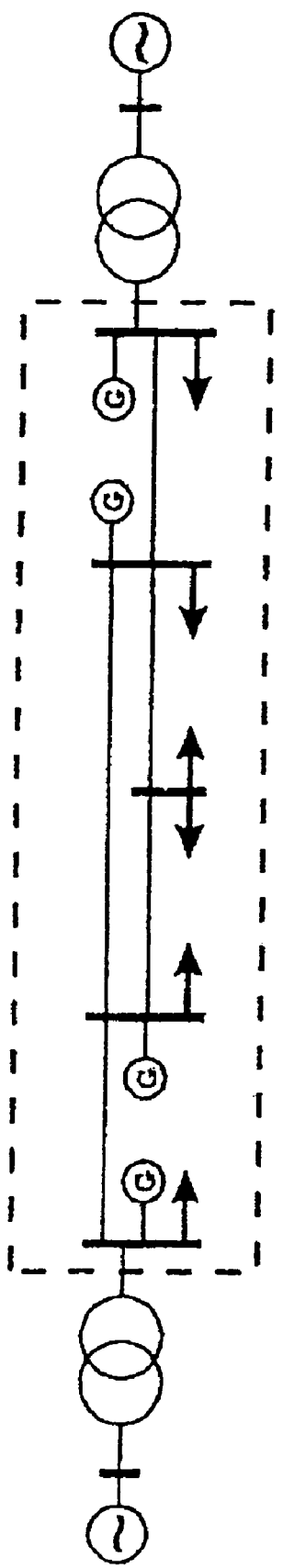
FIG. 1 shows an energy network with some energy generating units.

FIG. 1 shows the structure in principle of an energy generation network with some generators G.

A "ride-through" of embedded generation units means in this context that the generation units remain on the network and feed a short-circuit power to the network during the occurrence of a fault in the network. Active and reactive power are also fed to the network immediately after the elimination of a fault.

Figure 2:
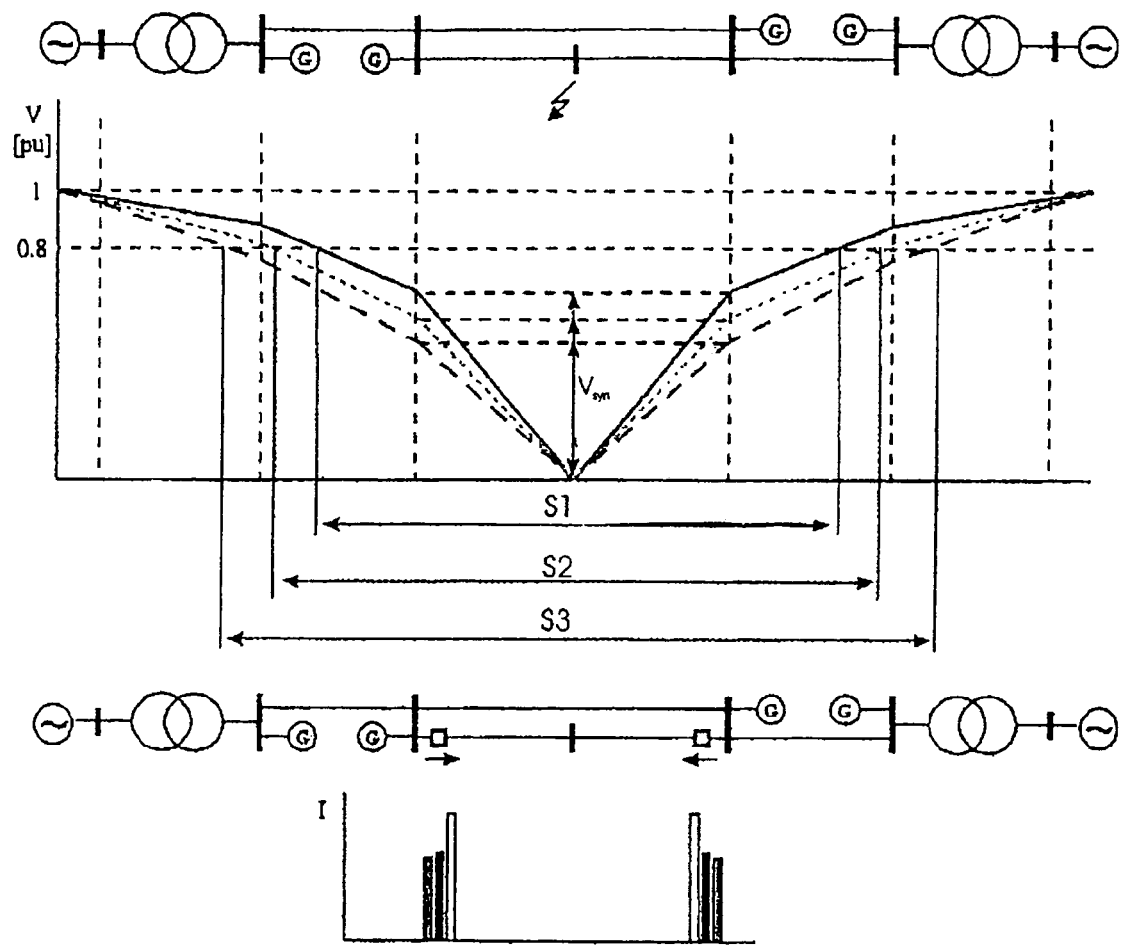
FIG. 2 shows a voltage collapse in a system as shown in FIG. 1 because of a fault.

The reasons for the "ride-through" demands in respect of the transmission access codes which are increasingly established by the network operators represent the following:

FIG. 2 shows a diagrammatic structure of an energy generation network, a diagram for illustrating a voltage collapse because of a fault in the network.

Figure 3:
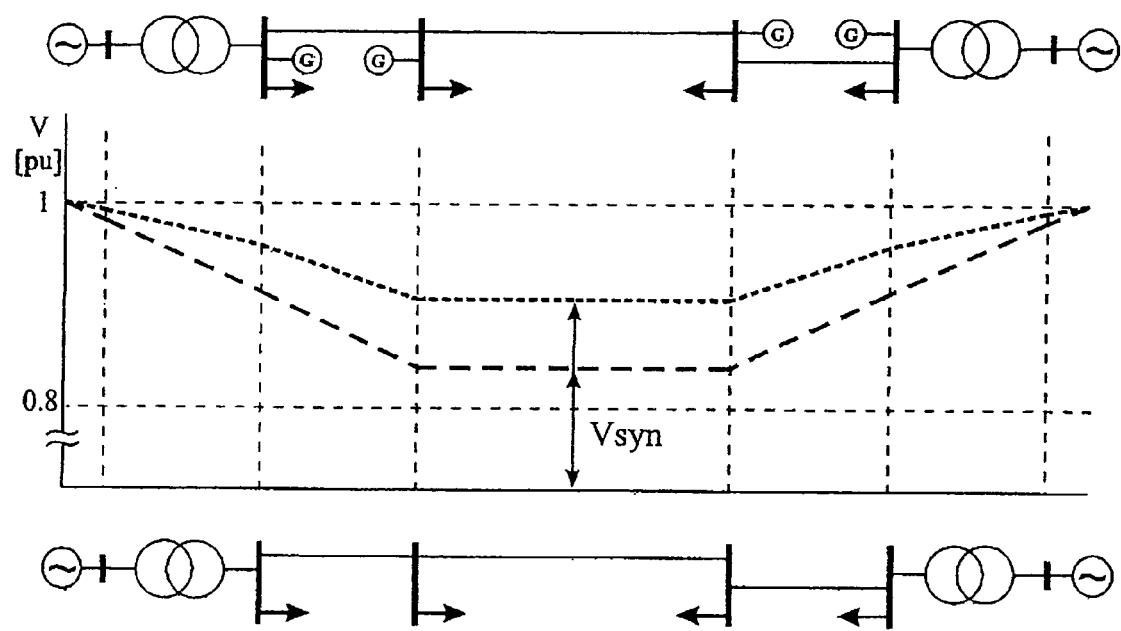
FIG. 3 shows a voltage profile after elimination of a fault in a system as shown in FIG. 1.

FIG. 3 shows a diagrammatic structure of an energy generation system and the voltage profiles prior to and after the elimination of a fault. In that case the upper curve represents the situation where generators G are arranged in the network while the lower curve represents the situation without generators.

In that respect FIG. 2 shows three different voltage curves with a voltage collapse. The voltage curve S3 shows the status quo of wind power installations at the time. The voltage curve S2 shows the case of wind power installations with a ride-through capability and the voltage curve S1 shows gas turbines with synchronous generators.

The voltage collapse region is intended to be limited to avoid an undervoltage which is induced by generation units being separated off (avoidance of chain-active power-deficits). The build-up stability is to be maintained or improved if the error location decouples parts of the system (synchronization power depends on the square of the voltage $V_{syn}$ in FIG. 2). A given fault current level should be provided (maintenance of the protection criterion and if possible setting of protection relays). An additional reactive power requirement by the generation units after the elimination of a fault should be avoided (risk of voltage collapse and overloading of the equipment by virtue of the cascading reactive power requirement in the case of a significant motor load). The stability reserve after the elimination of a fault should be improved (synchronization of the power depends as shown in FIG. 3 on the square of the voltage $V_{syn}$).

The operators of the energy supply networks must keep large power systems stable during the normal and fault states. System models are applied in that respect in this context for various purposes. The presence of suitable models is therefore essential for the network operators, in particular in cases involving great integration of embedded generation.

Dynamic system analysis is used in that respect to determine electromechanical transient build-up states after a disturbance to the system. That is effected used primarily in the region of transient stability analysis. The following characteristics for the development of corresponding system models are:

Calculation of current/voltage/power/power factor/torque/rotor angle in dependence on the time in a time range of about 100 ms after disturbances (electromagnetic transients have disappeared and the electromagnetic parts of the system are virtually in equilibrium with the exception of very slow electromagnetic modes) to some minutes (electromechanical transients have disappeared and the electromechanical parts of the system are also in equilibrium). Thermal transients are generally not covered by the system model.

Assumption of symmetrical system conditions including a fault impedance during the specified time range.

Application of equilibrium models for the equipment of the electrical network or in the case of larger rotating machines (synchronous or induction machines) and application of order-reducing dynamic models.

Accordingly that affords the following for the electrical part of the system:

mathematical (phasor) models for the electrical equipment with the exception of larger machines (for those machines there are models of mathematical and differential equations);

phasors with time-dependent square root values (RMS values), phase angles and sometimes a time-dependent system frequency. While square root values and the phase angle for all phasors can be different a single but not necessarily constant frequency is assumed for all phasors;

symmetrical models for the electrical part of the system, which can be represented by a single phase (positive sequence representation);

application of dynamic models for equipment which controls the system movement in the relevant time range (for example voltage and current controller); and application of dynamic models for the drive machine (for example mechanical inertia, torque production).

Models which fulfill the above-listed characteristics are referred to as "RMS-dynamic" or "mid-term" models. Models of that type permit a representation of large energy systems by maintenance of most of the relevant properties which monitor the dynamic modes of the system. Accordingly system analysis software used by network operators is often based on that approach.

It is a generally accepted requirement that the system models must be the same. Accordingly all models of the various components of the energy system should be of the same general type.

RMS-dynamic models for thermal generation units, transmission devices, protection systems, network control equipment etc are generally already available and correspondingly implemented. Thus the required models for wind power installations should represent models of the RMS-dynamic type as stated above.

Set forth hereinafter are the specific requirements for models of wind power installations.

At the present time the general regulations relating to connecting specific embedded generation units to the high-voltage networks in Germany are drawn up by the "Verband Deutscher Netzbetreiber VDN" ["Association of German Network Operators"]. Those regulations govern the technical details of network codes under the UCTE (transmission and distribution for units under the German energy feed statute).

In addition the German network operators specify the requirements for wind power installation models for various system analysis purposes. The following requirements have been specified hitherto for dynamic fault studies:

The turbine model is coupled to the positive sequence RMS-dynamic network model by way of phasors for the terminal voltage and the current.

It applies for symmetrical three-phase faults with residual terminal voltages of 0.1 ... 0.8 pu, for a fault elimination time of 0.1 to 3 sec, and for the time range of approximately 100 ms (after the transients have disappeared) to approximately 5 sec after faults (the critical range for transient stability). A model which can be used for a large number of turbines and can thus be applied to limited enlargements (insofar as acceptable in respect of accuracy). An option for specifying an initial operating point (energy to be produced). A possible manner of implementation of the model in already existing system analysis software with restricted possibilities for user-defined components.

The basic design and the function of the wind power installations according to the invention are described hereinafter.

Figure 4:
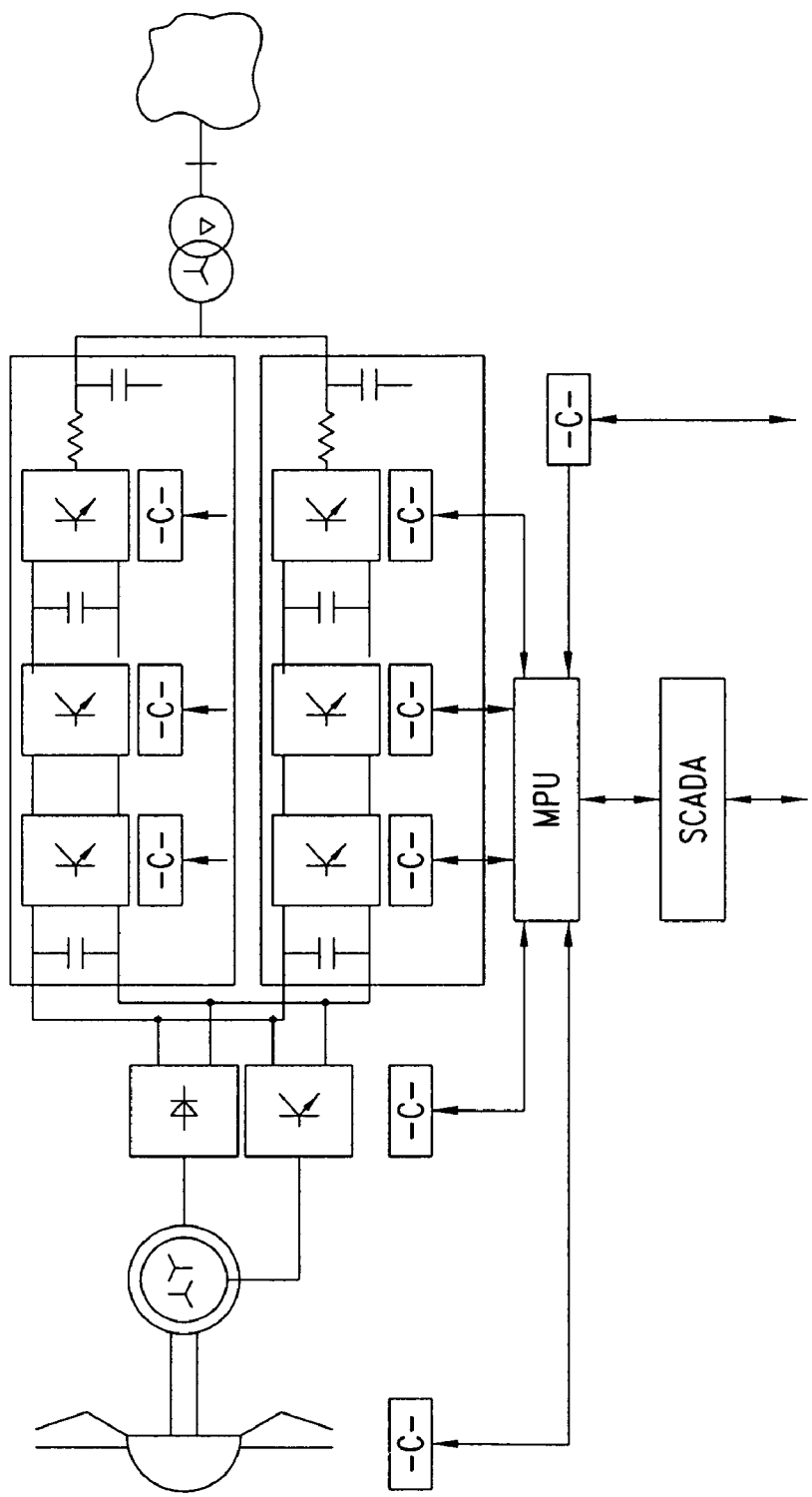
FIG. 4 shows the fundamental structure of a wind power installation according to the invention.

FIG. 4 shows a basic structure of the wind power installations according to the invention. In this respect in particular a wind power installation with two power modules is illustrated.

The wind power installation is equipped with three pitch-controlled rotor blades. The rotor is operated with an optimum pitch angle until the nominal speed of the motor is reached (with the exception of the starting conditions). If the speed exceeds the nominal speed by virtue of an increasing wind or by virtue of losses in the network (fault ride-through), the pitch control unit limits the speed and operates the wind power installation under safe conditions.

The rotor moves a six-phase synchronous generator directly—without transmission. The rotor is electrically excited. The excitation system is connected to the dc voltage bus with the exception of the starting phase of the wind power installation. The excitation control is part of the control system of the wind power installation. The generator supplies a variable voltage to a dc voltage bus.

The dc voltage-ac voltage intermediate circuit has power modules. The number of modules depends on the structure of the wind power installation. The dc voltage intermediate circuit of each module includes a chopper for various purposes, balancing capacitors, an IGBT inverter and a filter assembly.

The (sole) transformer is also part of the filter design.

From the point of view of the network the power modules under normal conditions and under slowly changing conditions behave like controlled symmetrical current sources (in respect of the fundamental frequency of the currents). The square root (RMS) of the currents and the phase angle thereof is controlled and held in symmetrizing relationship.

The inverter is controlled in accordance with the various parameters of the wind power installation. As the control of the inverter represents a substantial part of the overall control of the wind power installation, the possibility of isolating that control is very limited. That is the reason for a given inevitable enlargement of the model.

Fast control is necessary for example for the electronic power apparatuses of the inverter, the choppers etc. That is achieved by various distributed controllers C as shown in FIG. 4. In the RMS time range most of the controllers can be viewed as being disposed in the equilibrium condition.

The voltage and power control and some other control tasks relate to the dynamic conditions of the wind power installation in the RMS time range. Those controllers must be explicitly taken into consideration when forming the model. The MPU and the specific controller interface as shown in FIG. 4 illustrate the equipment for that control level.

Standard communication with external interfaces and correction of settings, such as for example power limitation $P_{max}$ and the phase angle, are obtained by means of the SCADA unit. That system is not provided for use for fast network control purposes. The fast control standards use specific controller interfaces.

The fundamental behavior during symmetrizing system faults is described hereinafter.

The test system for the development and testing of the ride-through properties of the wind power installations according to the invention is described by the following main features. There is provided a reduced-size generator/rectifier/dc voltage intermediate circuit/inverter/filter system with an original electronic system for the development and testing of the underlying design concept, the control strategies and the algorithm, the software and the items of electronic equipment. A flexible network allows various kinds of system configurations and faults. A severely noisy PCC gives rise to hard conditions for measuring apparatuses and control components.

A weak PCC in terms of short-circuit power and frequency causes difficult operating conditions for a system control (concept as well as algorithm and software).

Figure 5:
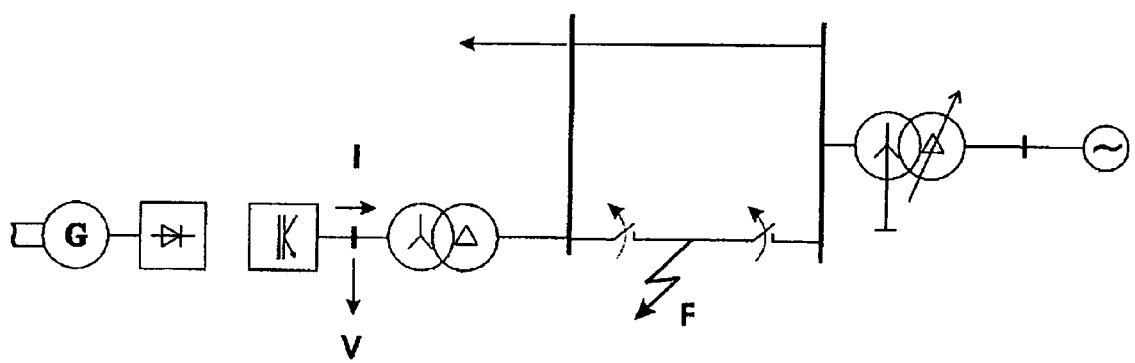
FIG. 5 shows the fundamental structure of a test system.

FIG. 5 shows a configuration of the test system for ride-through tests. The following fault was initiated at the indicated location:

A symmetrical 3-phase fault F with zero impedance is of a duration of 770 ms.

Elimination is effected by a phase jump of approximately −8°. The short-circuit power ratio is reduced from approximately 30 to 15.

The currents I in the inverter and also the terminal voltages V (line to earth) is measured at the locations indicated by the arrows. The results of that test are shown in FIGS. 6 to 9. The sampling rate was selected at 3 kHz. Pre-filters (anti-aliasing) were not used in this case.

Figure 6:
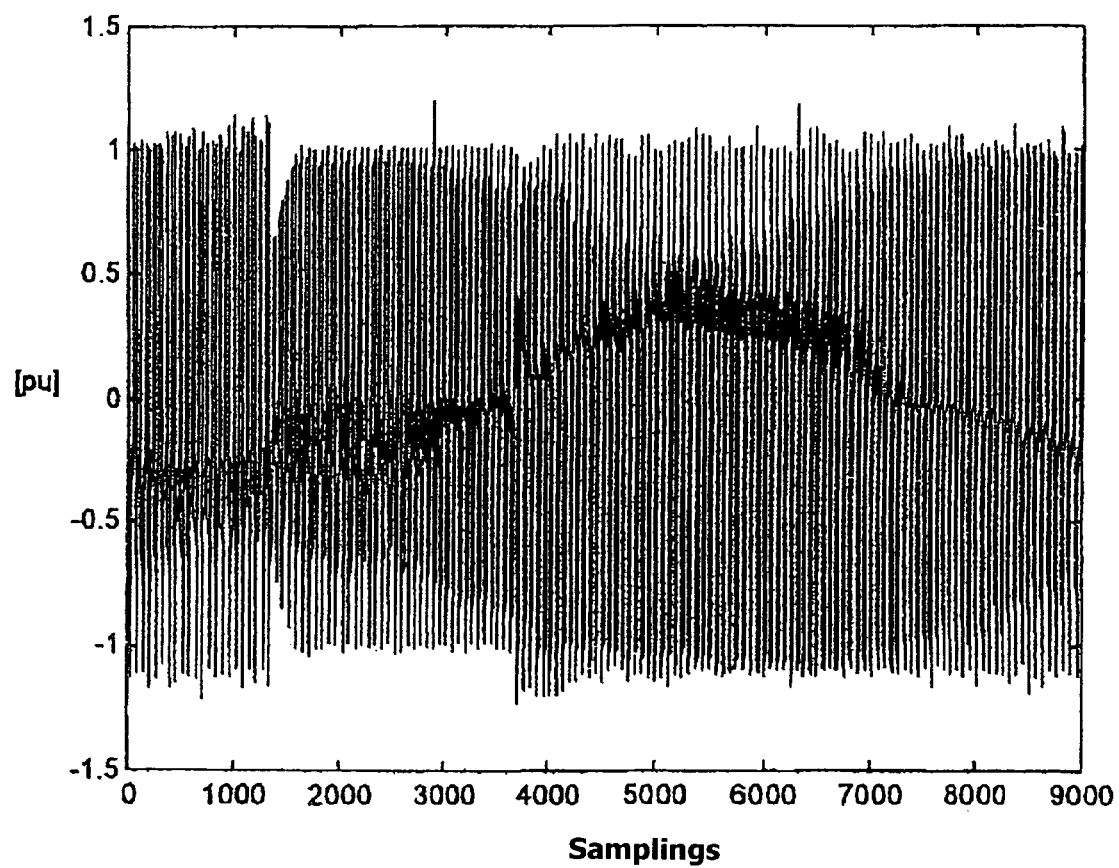
FIGS. 6 to 9 show measurement results for the test system shown in FIG. 5, FIGS. 10 to 13 show further test results for the system shown in FIG. 4, FIGS. 14 and 15 show analytical results of the system shown in FIG. 1, and FIGS. 16 and 17 show further analytical results.

In FIG. 6 the current I and the voltage V are shown in dependence on samplings. In this case a fault occurs approximately between 1500 and 3500 samplings. During the occurrence of that fault voltage collapse takes place.

Figure 7:
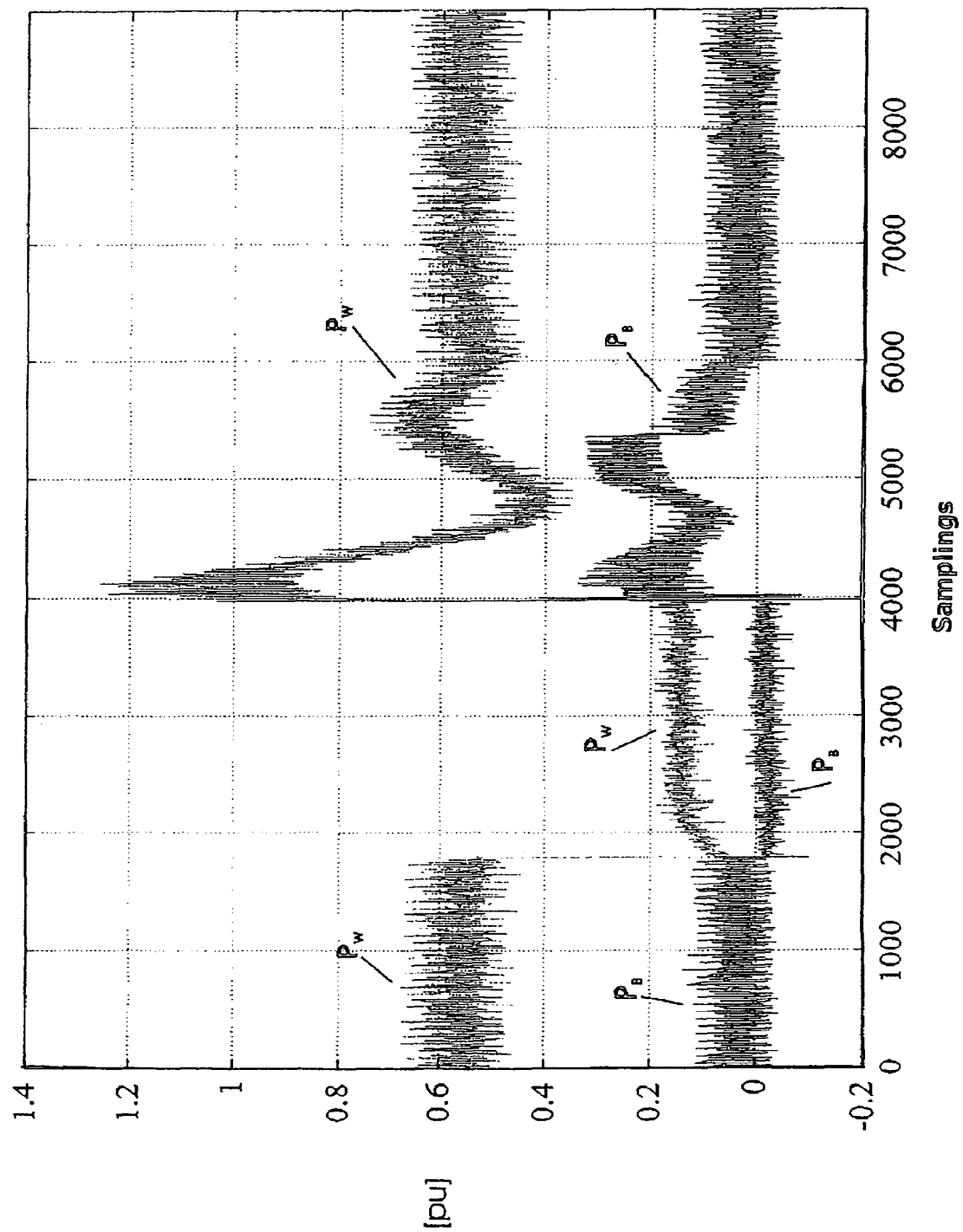

FIG. 7 shows the active power $P_w$ and the reactive power $P_b$. In this case the active power $P_w$ is represented by the upper curve while the lower curve represents the reactive power. Here a fault occurs approximately after 1800 samplings to about 4000 samplings. During the occurrence of the fault the active power is reduced, more specifically from about 0.6 to below 0.2 pu. After elimination of the fault, that is to say approximately at 4000 samplings, the active power is briefly increased. That active power peak goes to 1.2 pu. The reactive power $P_b$ is also increased after elimination of the fault and then brought again substantially to zero.

Figure 8:
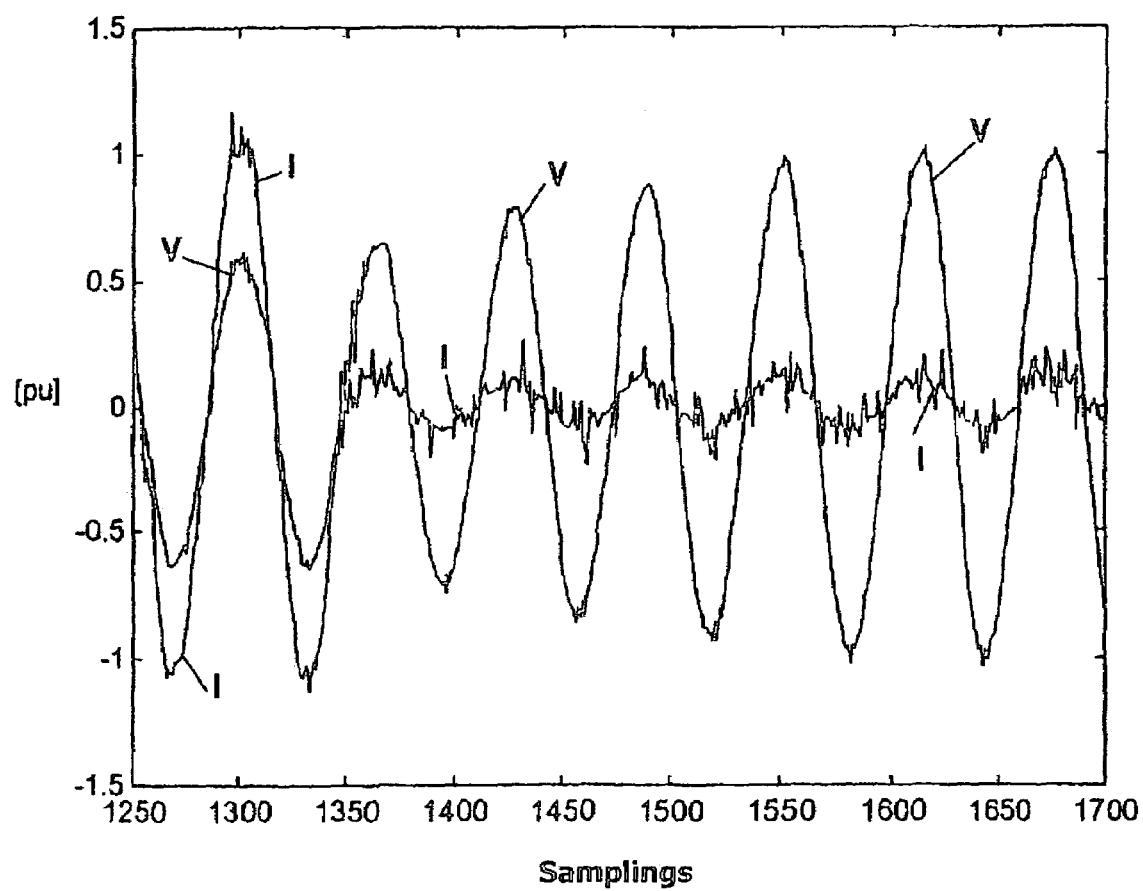

FIG. 8 shows a portion of the representation in FIG. 6. In this respect it can be seen that the current dies away after the occurrence of the fault and thereafter builds up again. In the case of the voltage configuration V however the situation is different as the voltage configuration fluctuates greatly.

Figure 9:
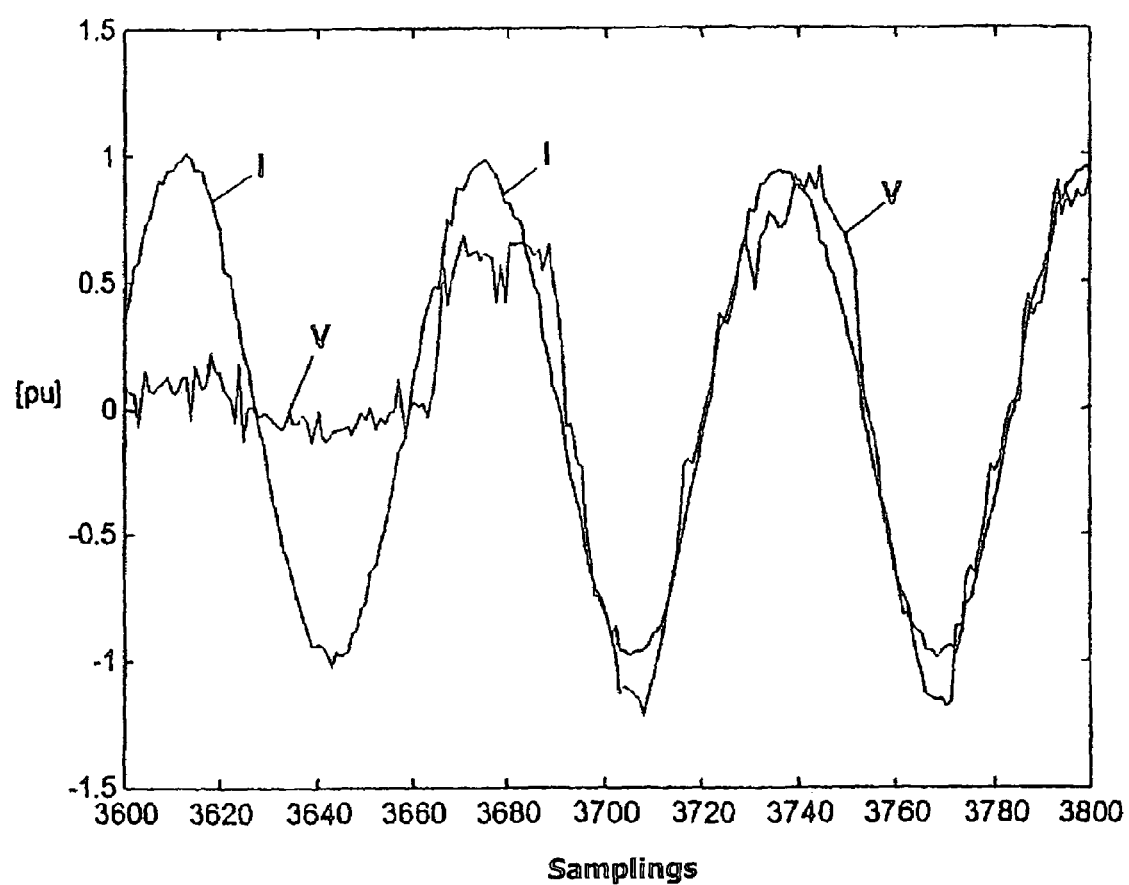

FIG. 9 shows a portion from FIG. 6 after elimination of the fault. It can be seen here that the current oscillates while the voltage initially remains at one level and then after about 3660 samplings also begins to oscillate.

The power modules of the original size, as stated hereinbefore and as shown in FIG. 4, were suitably tested in the test devices. The tests carried out were conducted firstly to analyze the loading of all power-electronic components during and after symmetrical system faults.

The corresponding test results are shown in FIGS. 10 to 13.

Figure 10:
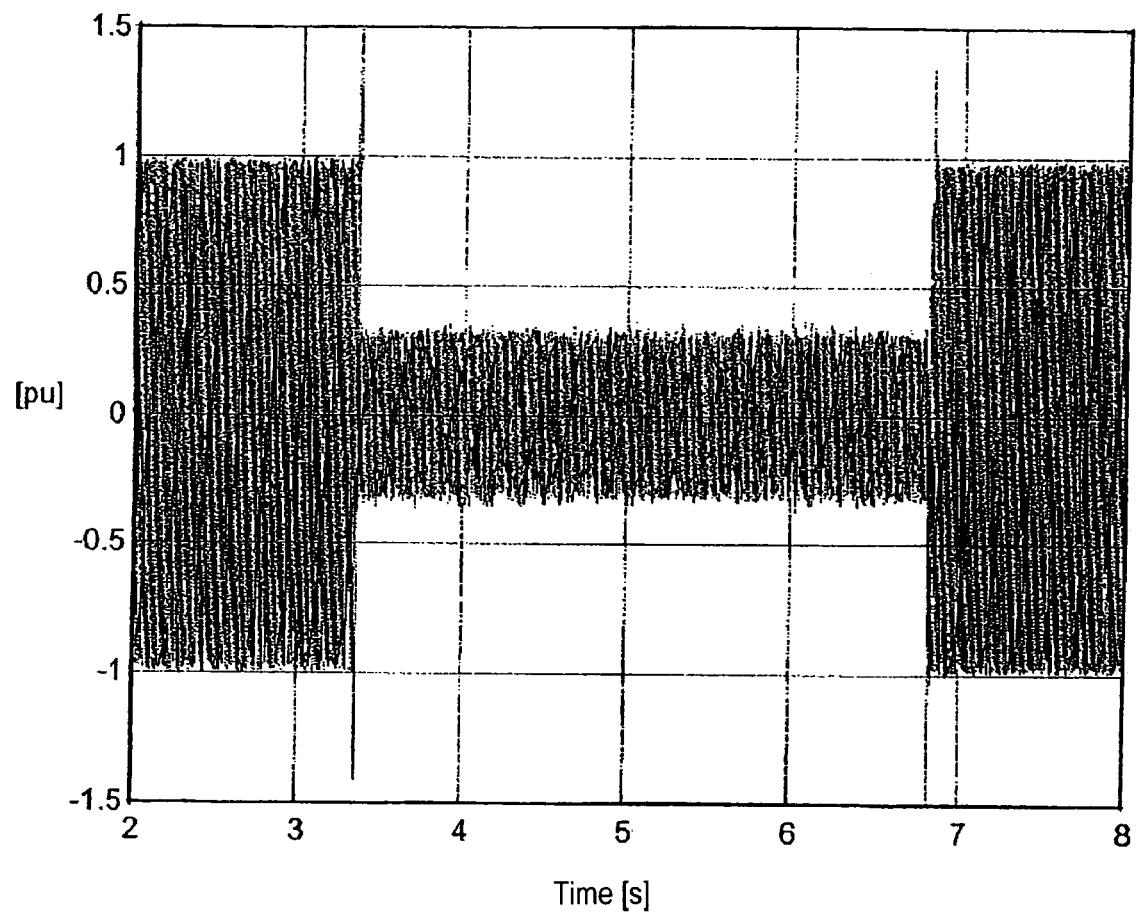

FIG. 10 shows the terminal voltage in relation to time. Here a fault occurs at about 3.4 seconds and lasts up to about 6.8 seconds. The above-described voltage collapse occurs during the fault.

Figure 11:
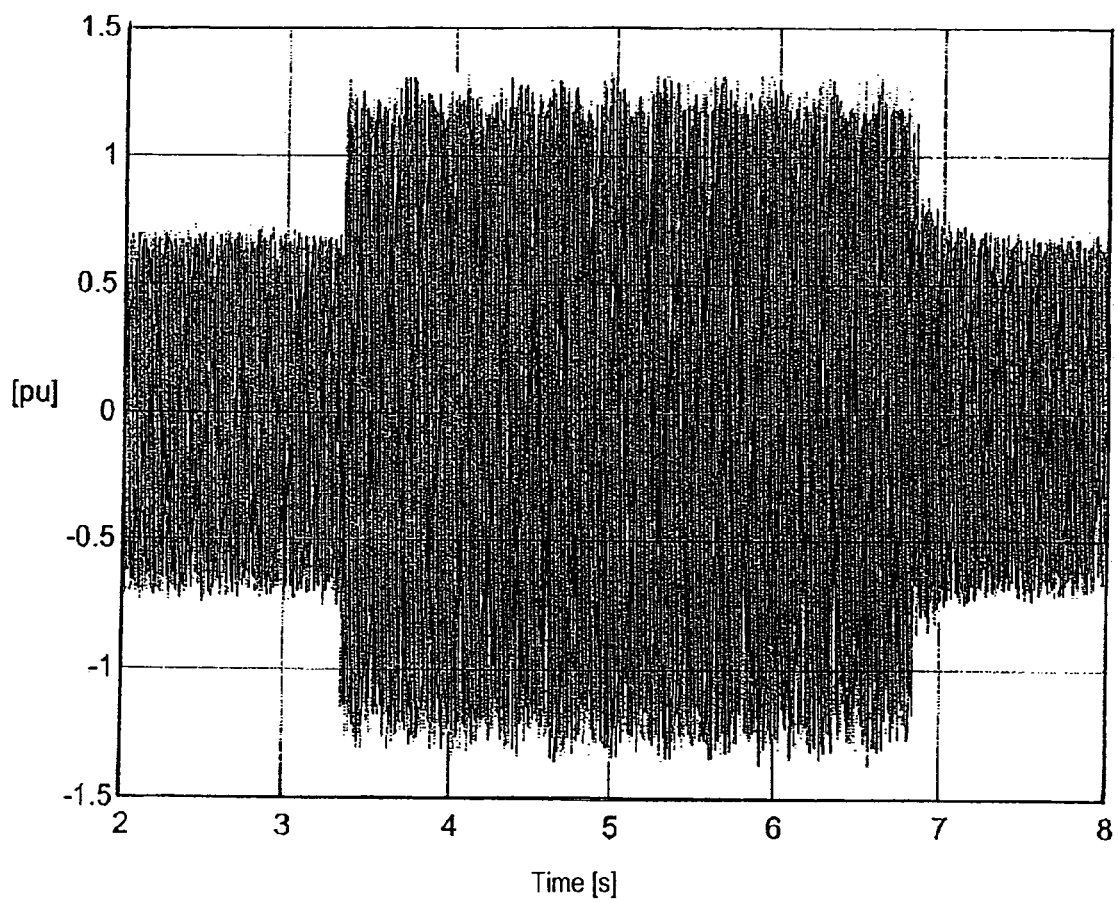

FIG. 11 shows the current in relation to time during the occurrence of a fault. While a voltage collapse occurs as shown in FIG. 10 the current rises during the fault.

Figure 12:
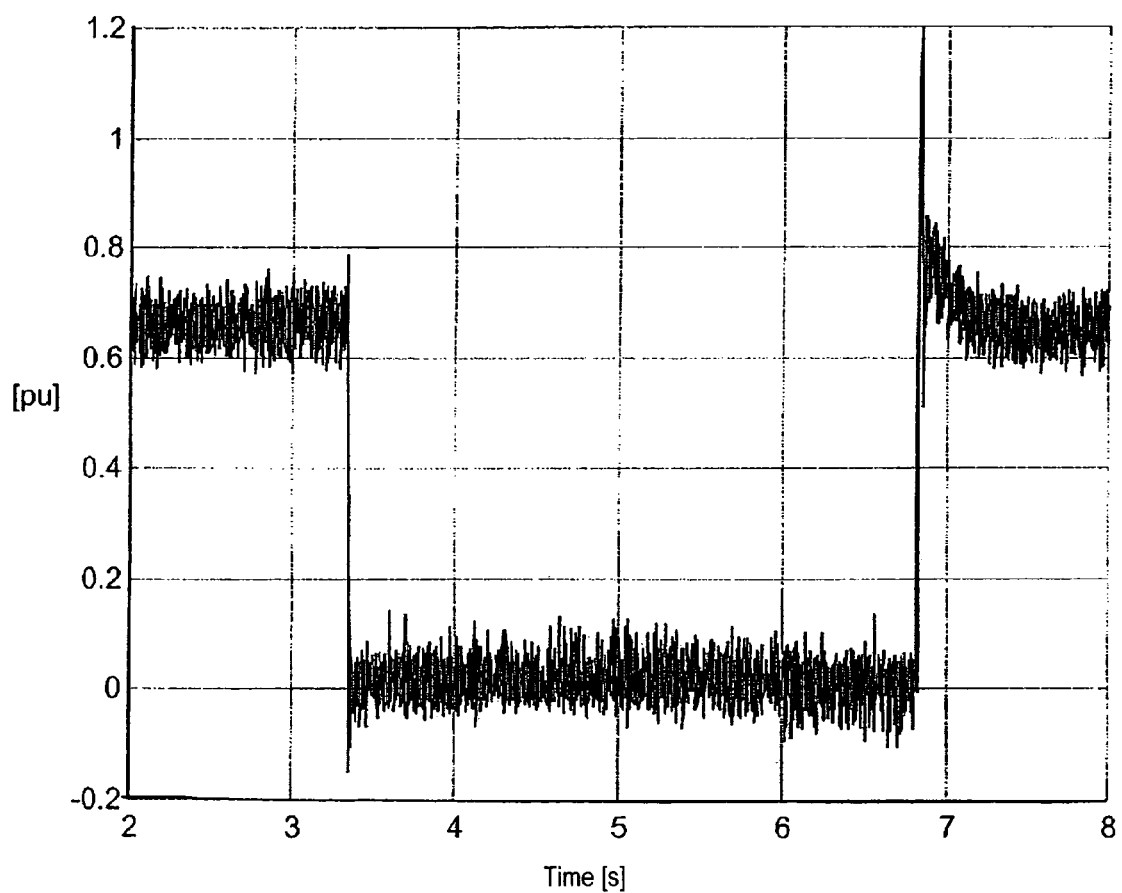

FIG. 12 shows the active power in relation to time during the occurrence of the fault. During the fault between 3.4 and 6.8 seconds the active power falls to zero. After elimination of the fault there is a peak in the active power.

Figure 13:
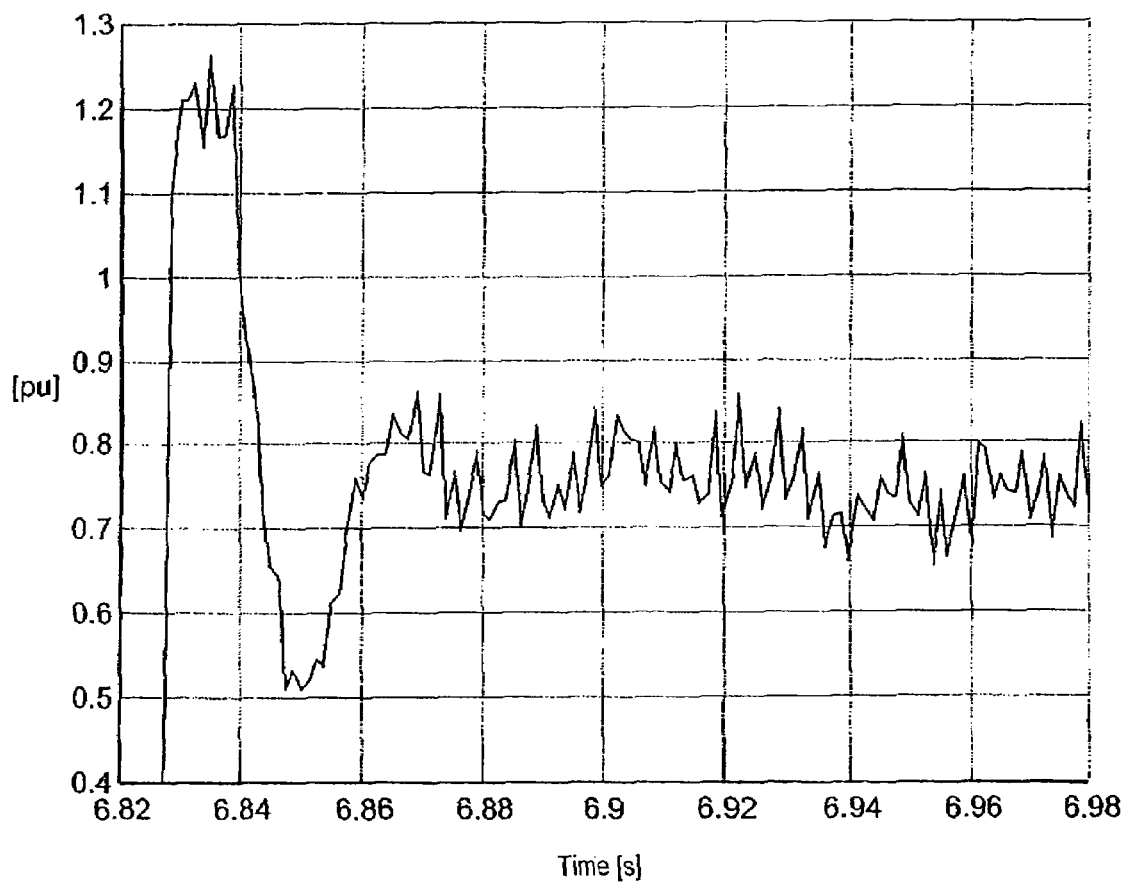

FIG. 13 shows a portion from FIG. 12 at the time of elimination of the fault. The peak in the power can be clearly seen here. The power peak goes to over 1.2 pu. Thereafter the active power falls back to a value of between 0.7 and 0.8 pu.

The test system shown in FIG. 5 was modeled in accordance with the system analysis approach which is usually employed for transients and also for dynamic system analyses.

The model of the test system has a 6-phase generator with harmonic flux connection in the air gap (FEM-based parameter identification), a stator rectifier and rotor excitation devices including controller, a dc voltage intermediate circuit including all power electronic components (choppers) and controller, an inverter including controller, a relevant MPU functionality, a filter, a transformer including vector group and earthing, and lines including earth (full matrix representation).

That system model is a non-linear full-state hybrid model (continuous/discrete hybrid model) in the time range. The continuous part has eigenvalues in various time scales and must be resolved by numerical integration methods.

The ride-through scenario which is applied for the ride-through test shown in FIG. 5 was analyzed with that model. However the fault duration was limited to 100 ms by curtailing the time-consuming numerical integration procedure. In contrast to the active test system the equivalent system generator was not disturbed stochastically in order to depict the noise of the network.

Figure 14:
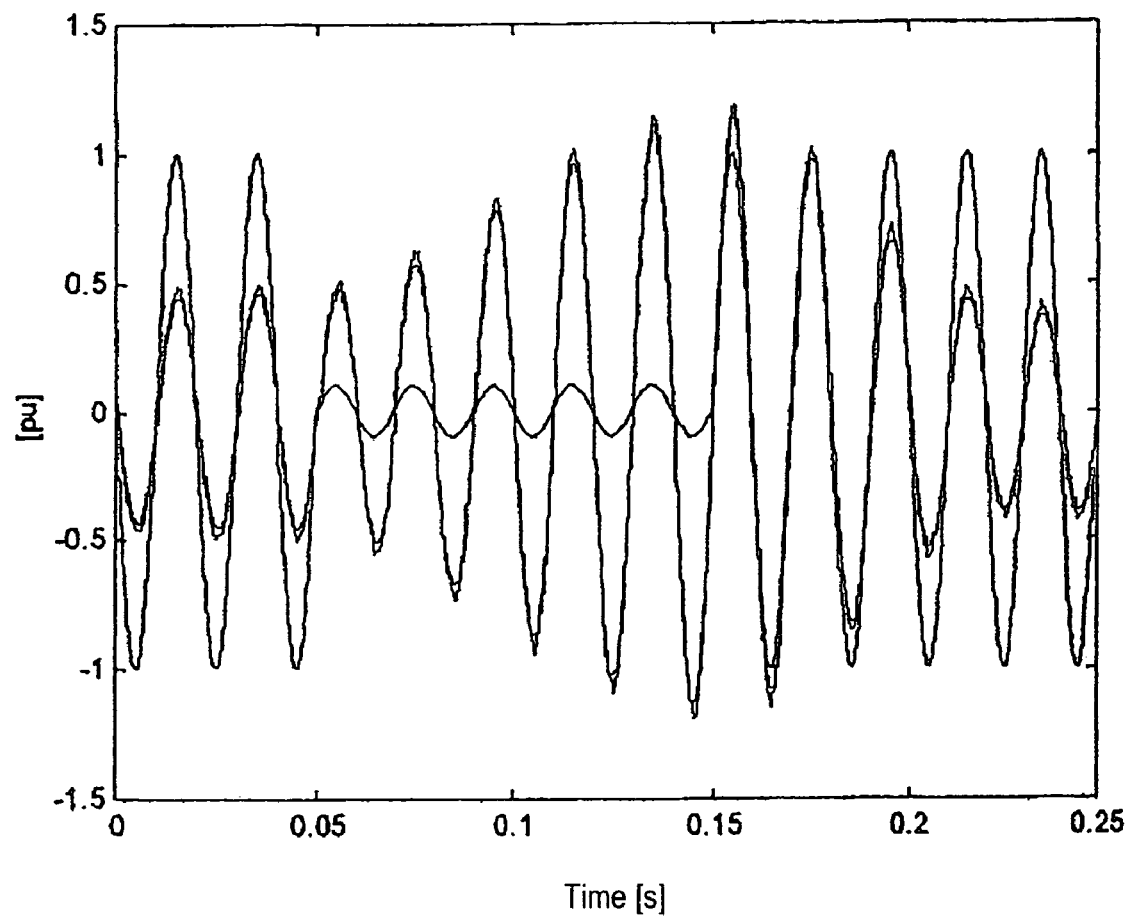
Figure 15:
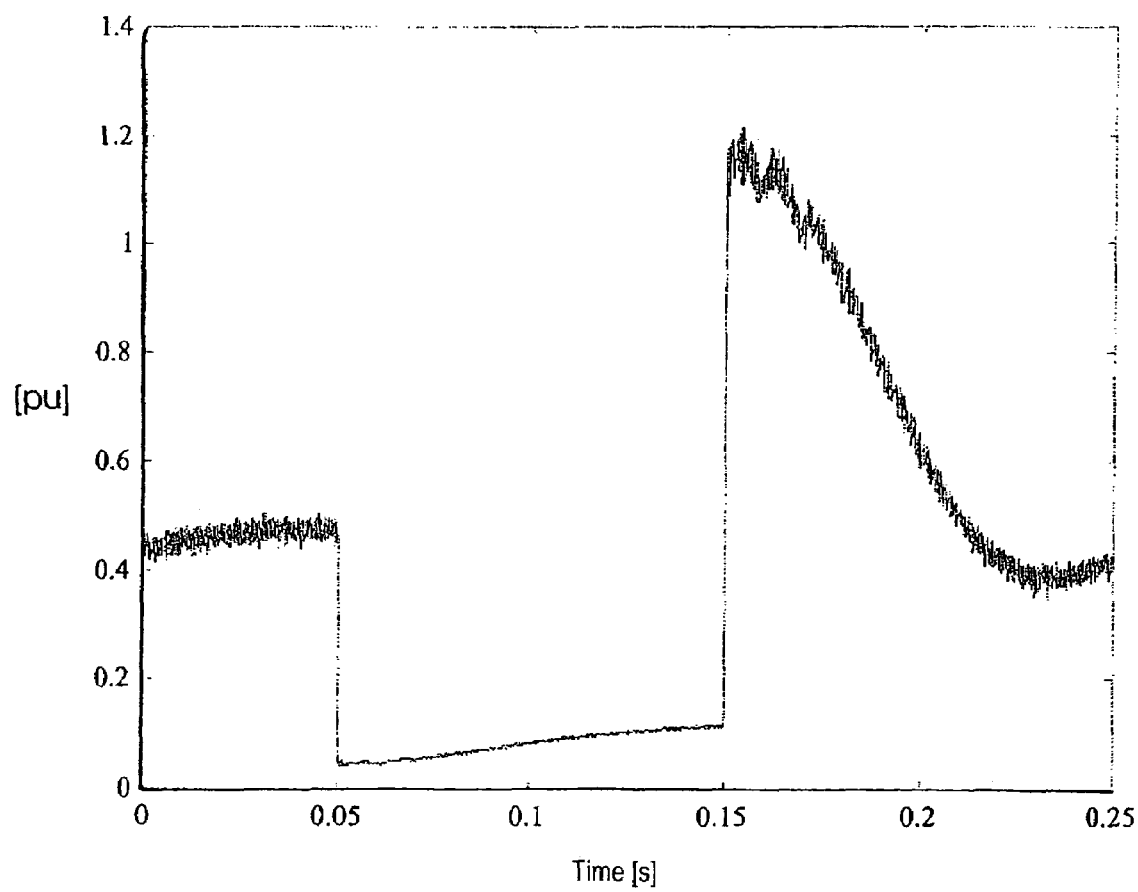

FIGS. 14 and 15 show selected analytical results. The analytical results can be compared to the measurements of FIGS. 6 to 9. In interpreting that comparison, the shortened fault duration and the noise of the network must also be taken into consideration.

FIG. 15 shows the active power upon the occurrence of a fault. Here too it is possible to see the clear collapse in the active power during the fault, that is to say between 0.05 and 0.15 seconds. After elimination of the fault at 0.15 seconds there is in this case also a briefly increased delivery of active power, in which respect that delivered active power can be up to 1.2 pu.

As already described above the network operators often use software packages for dynamic system analysis based on the RMS-dynamic approaches. That type has significantly fewer dynamic states compared to transient models and can be developed using order reduction.

An RMS-dynamic model which takes account of all relevant structural aspects in this area and which satisfies the above-stated criteria was thus developed for the test system.

Figure 16:
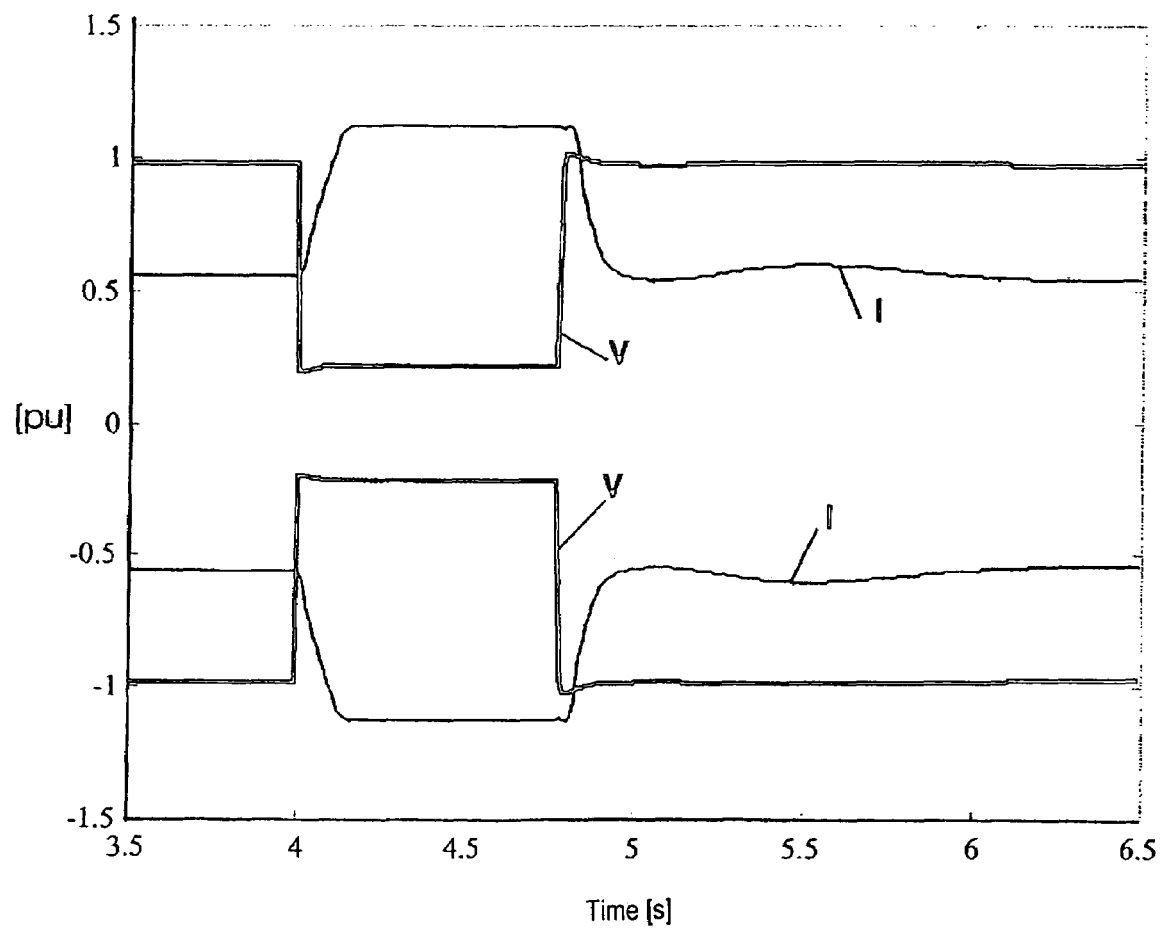
Figure 17:
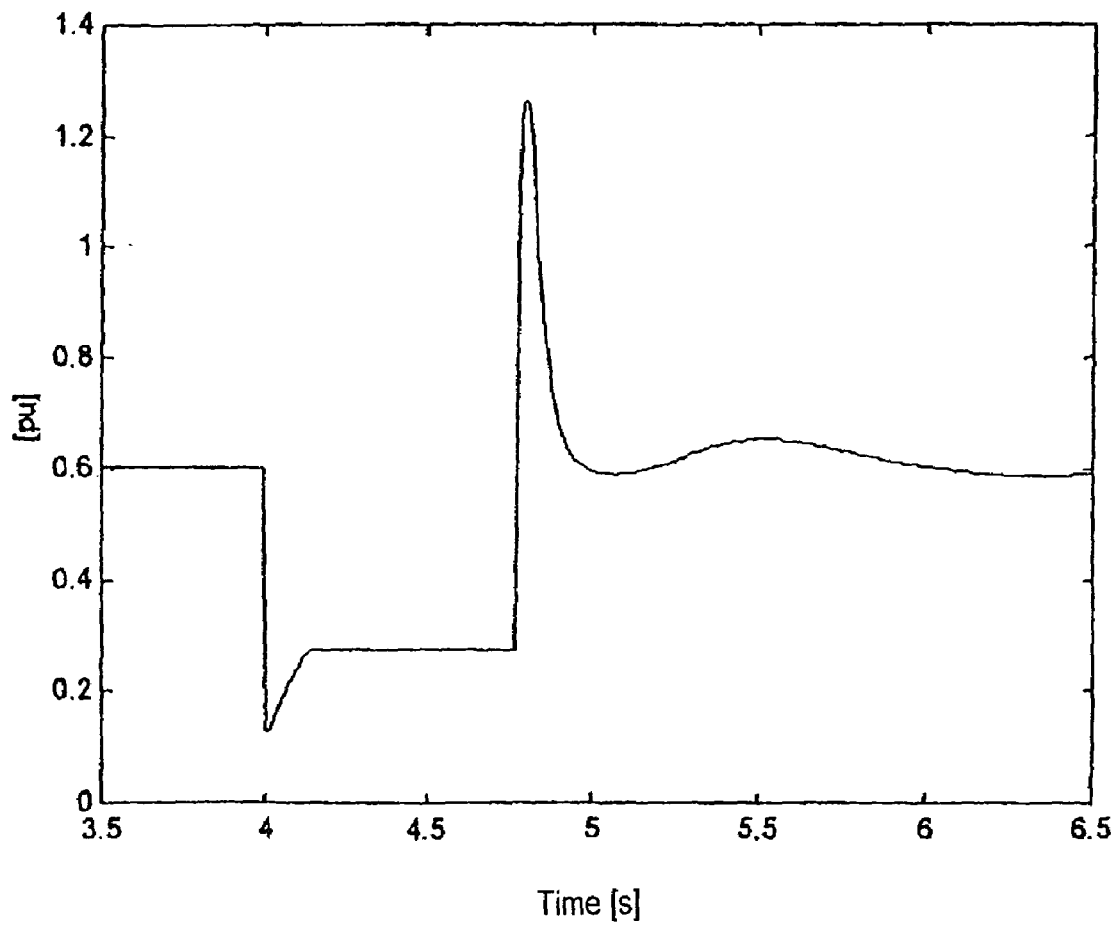

FIGS. 16 and 17 represent the corresponding analysis results for the same ride-through scenario as the measured scenario. The results can be compared to the measurement results shown in FIGS. 6 and 7 and the results from the transient analysis shown in FIGS. 14 and 15.

FIG. 17 represents the active power calculated from the current and voltage configurations shown in FIG. 16. In this case also it is possible to see a briefly increased active power delivery directly after elimination of the fault.

The wind power installations according to the invention thus provide a ride-through option, provide a short-circuit power of about 1.0 to 1.2 pu on the standardized power axis and produce active and reactive power immediately after the elimination of a fault. The production of active power is effected by virtue of remaining on the network for the entire time without interruption.

For dynamic system analysis purposes there are provided models based on a positive sequence RMS approach and transfer function representations. For situations which are not covered by those models (transient phenomena and phase-unbalance faults), detailed models are required.

The above-described, briefly significantly increased generator power is delivered substantially by the generator and the intermediate circuit. That effect does not represent a system-inherent behavior but must be implemented by. suitable control of the intermediate circuit.

In a normal operating situation in which the generator produces for example 0.6-times the nominal power the synchronous machine operates with a pole rotor which is excited with direct current and which produces a rotating field in the stator which in turn induces voltages in the stator windings. In that case the pole rotor leads the field rotating in the stator by the pole rotor displacement angle. Upon the occurrence of a fault in the network for example with a voltage collapse there is a reduced power delivery to the network, which also leads to a rise in the intermediate circuit voltage. Provided in the intermediate circuit is a so-called chopper which dissipates the excess power by way of load resistors or consumes it in order to prevent overspeeding of the rotor. That increase in the intermediate circuit voltage however also has an effect on the generator. As the control of the chopper also determines the level of the intermediate circuit voltage it also has a certain influence on the terminal voltage of the generator so that this voltage, in the wind power installations according to the invention, is somewhat higher than in normal operation.

In the generator that results in a slightly higher rotor speed which is reflected in the mechanical system comprising rotor blade, hub and pole rotor. At the same time however the rotor displacement angle also becomes somewhat less. As that results in a somewhat lower generator moment, a somewhat higher speed is produced.

When the network reverts to the normal operating conditions, at the first moment a higher level of power flows into the network by virtue of the higher intermediate circuit voltage, through the inverters. Since as a result the intermediate circuit voltage falls, the terminal voltage of the generator also changes, the rotor displacement angle increases again, the generator moment increases and the rotary speed of the mechanical system again becomes slightly less. For a relatively short period of about 100-200 milliseconds the generator delivers a higher power, by virtue of the slightly higher speed, until the mechanical system is braked to a corresponding degree. The energy produces the additional power which can be delivered into the network.

The briefly increased power delivery is thus effected by specific targeted control of the chopper.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of operating a wind power installation, wherein the wind power installation under first operating conditions in a normal operating mode delivers a first power to a connected electrical network, which is proportional to the wind speed, comprising:

controlling the wind power installation in such a way that it remains on the connected electrical network when a disturbance occurs and delivers a second power to the connected electrical network, which is less than the first power, and under the first operating conditions upon cessation of the disturbance briefly delivers a third power which is significantly higher than the first power to a connected electrical network.

2. The method according to claim 1 wherein the third power represents a short-circuit power.

3. The method according to claim 1 wherein the wind power installation has an intermediate storage means and the increased third power is obtained by control of the intermediate storage means.

4. The method according to claim 3 wherein the wind power installation has a dc voltage intermediate circuit as the intermediate storage means and the increased third power is obtained by control of the dc voltage intermediate circuit.

5. The method according to claim 4 wherein the dc voltage intermediate circuit has a chopper and the increased third power is obtained by control of the chopper in the dc voltage intermediate circuit.

6. The method according to claim 3 wherein the rotation of the generator of the wind power installation is used as the intermediate storage means and the increased third power is obtained by control of the rotation.

7. A wind power installation for the delivery of power to a connected electrical network, comprising:

a control unit for controlling the wind power installation in such a way that under first operating conditions in normal operating mode a first power is delivered to the connected electrical network, which is proportional to the wind speed, that the wind power installation remains on the connected electrical network when a disturbance occurs and delivers a second power to the connected electrical network, which is less than the first power, and under the first operating conditions upon cessation of the disturbance briefly delivers a third power which is significantly higher than the first power to a connected electrical network.

8. The wind power installation according to claim 7 wherein the wind power installation has an intermediate storage means and the control unit is adapted to obtain the increased third power by control of the intermediate storage means.

9. The wind power installation according to claim 8 comprising a dc voltage intermediate circuit as the intermediate storage means, wherein the control unit is adapted to obtain the increased third power by control of the dc voltage intermediate circuit.

10. The wind power installation according to claim 9 wherein the dc voltage intermediate circuit has a chopper and the increased third power is obtained by control of the chopper in the dc voltage intermediate circuit.

11. The wind power installation according to claim 8 wherein the rotation of the generator of the wind power installation is used as the intermediate storage means and the increased third power is obtained by control of the rotation.

* * * * *